Dec. 8, 1964   G. D. JONES   3,160,204
HEAT EXCHANGE INCLUDING IMPROVED SUPPORTING BRACKET
Filed Aug. 29, 1962

INVENTOR.
GARY D. JONES
BY *Walter E...*
HIS ATTORNEY

United States Patent Office 3,160,204
Patented Dec. 8, 1964

3,160,204
HEAT EXCHANGE INCLUDING IMPROVED
SUPPORTING BRACKET
Gary D. Jones, Louisville, Ky., assignor to General
Electric Company, a corporation of New York
Filed Aug. 29, 1962, Ser. No. 220,276
1 Claim. (Cl. 165—67)

The present invention relates to heat exchangers and is more particularly concerned with a heat exchanger including an improved bracket for spacing and supporting a plurality of heat exchanger sections or tiers.

Many heat exchangers of the type employed as condensers for household refrigerators comprise three or more superimposed sections or tiers of serpentine tubing. In order to support these tiers in spaced relationship and to reduce or damp vibrations resulting from vibration of the tubing during operation of the compressor, various supporting brackets have been employed.

The present invention is particularly concerned with an improved bracket for this purpose, which bracket can be easily assembled on the end turns of the serpentine tubing forming the various condenser tiers or sections and which includes means for firmly engaging and clamping these various end turns.

A specific object of the invention is to provide a condenser bracket including a plurality of slots for receiving at least one end turn of each condenser tier or section, the bracket being so constructed that the base or outermost portion of each end turn can be partially inserted into its cooperating slot during the initial step of positioning the bracket on the end turns and that thereafter, as the end turns are further inserted into the slots, portions of the bracket will firmly grip the end turns to provide a rigid support which will damp vibrations of the condenser tubing during operation of a refrigerating system including the condenser.

In carrying the invention into effect, there is provided a heat exchanger including a plurality of tiers or sections each comprising a plurality of parallel passes connected by U-shaped end turns and a bracket adapted to be slipped over at least one end turn of each section for supporting the sections relative to one another. To this end the bracket comprises a sheet metal member including a plurality of slots each of which receives an end turn. The slots which engage the end turns of the outer condenser sections are formed adjacent the ends of the bracket and are of a size slightly greater than that is required to receive the end turns. To provide a clamping action when the outer end turns of the outer condenser sections are fully inserted in these outer slots, the ends of the bracket are reverse bent so that edge portions of the bracket partially overlie the outer slots in spaced relationship therewith. Contact of an end turn with this edge portion when the end turn is fully inserted into a slot, causes the end turn to be clamped or gripped between the edge portion of the bracket and the opposite side of the slot. At least one intermediate slot formed in the bracket for receiving the end turns of the intermediate section is also in the form of an elongated slot which is sufficiently wide at its mid-section to permit the base of the end turn to be initially inserted into the slot but which is somewhat narrower at its end sections than the outer diameter of the condenser tubing so that when the bracket is completely mounted on the end turn, these end sections of the slot will firmly engage the tubing. To facilitate insertion of the intermediate end turn into the intermediate slot, the sheet metal member is provided with slits extending laterally from the ends of the intermediate slot so that one side edge of the slot is in effect defined by the free end of a bendable tab which will give sufficiently to permit the bracket to be slipped entirely onto the end turn.

For a better understanding of the invention reference may be had to the accompanying drawing in which.

While the present invention is applicable to any heat exchanger comprising a plurality of superimposed sections or tiers, each comprising a plurality of parallel passes connected by U-shaped end turns, the invention will be specifically described in connection with a light weight condenser comprising a continuous conduit formed to provide a plurality of parallel passes in a plurality of planes with the parallel passes in each plane connected by U-shaped end turns.

Figure 1:
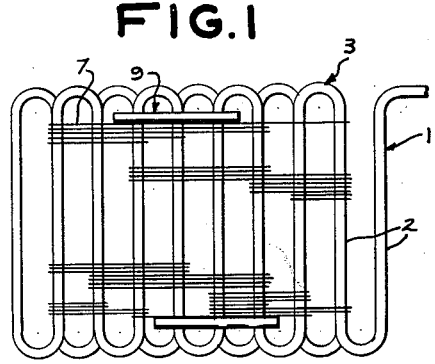
FIGURE 1 is a plan view of a heat exchanger embodying the present invention.
Figure 2:
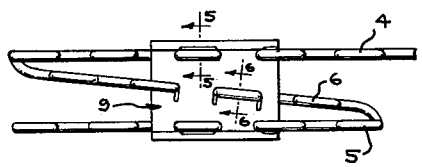
FIGURE 2 is an end elevational view of the heat exchanger shown in FIGURE 1.

Such a condenser may be made, for example, by forming a continuous conduit into serpentine form to provide a structure including a plurality of passes in the same plane connected by U-shaped end turns and thereafter folding this structure along a plurality of lines parallel to the passes to form a folded condenser including a plurality of superimposed sections or tiers. Such a condenser is illustrated in FIGURES 1 and 2 of the drawing as comprising a continuous tubing 1 bent into serpentine form to provide a plurality of parallel passes 2 connected by end turns 3, the serpentine conduit being folded to provide a folded condenser including an upper section 4, a lower section 5 parallel to the upper section and an intermediate inclined section 6. In the illustrated embodiment of the invention the various parallel passes of each section have welded or brazed thereto a plurality of wires 7 extending perpendicular to the passes to provide additional heat transfer surfaces.

A condenser of this type in which the conduit is for example ¼ inch copper or steel tubing is of relatively light weight construction and is adapted to be mounted in the machinery compartment of a household refrigerator along with the compressor and other high side components of the refrigerating system.

For the purpose of supporting the sections 4, 5 and 6 in spaced relationship so as to provide for good air flow over and between the various sections for cooling the condenser during operation of the refrigerating system, and to prevent or damp vibrations of various parts of the condenser during operation of the refrigerant compressor, there is provided in accordance with the present invention a low cost bracket 9 which can be easily mounted on the condenser sections in firm engagement with one or more end turns of each condenser section.

Figure 3:
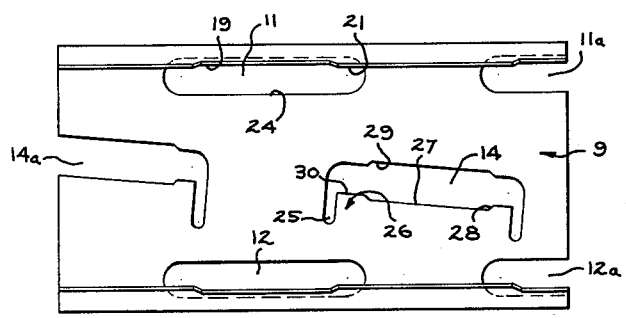
FIGURE 3 is an elevational view of a bracket employed in the practice of the present invention for spacing and supporting the various tiers or sections of the condenser shown in FIGURES 1 and 2.
Figure 4:
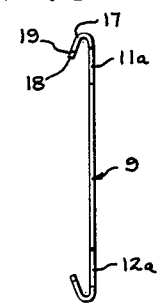
FIGURE 4 is an edge view of the bracket shown in FIGURE 3.

With particular reference to FIGURES 3 and 4 of the drawing, it will be seen that the bracket 9 is a stamped sheet metal member having a plurality of slots therein which are designed to accommodate the end turns of the condenser structure. More specifically the bracket includes at least one full upper slot 11 for receiving one end turn of the upper condenser section 4 and at least one full slot 12 for receiving an end turn of the lower condenser section 5. An intermediate slot 14 is provided for receiving one end turn of the intermediate condenser section 6. In the illustrated embodiment of the invention the sheet metal bracket is of rectangular configuration so that it also contains partial slots 11a, 12a and 14a for receiving a portion of the end turns adjacent to those respectively received in slots 11, 12 and 14.

In accordance with the present invention, the bracket 9 is so constructed that the end turns to be engaged thereby can be manually inserted part way into their respective slots so that the bracket can be initially positioned on the desired end turns. It is also constructed so that as the bracket is forced further onto these end turns, frictional engagement of the bracket with the end turns causes the bracket to firmly grip the tubing comprising the condenser sections.

To this end the upper and lower parallel slots 11 and 12, that is the slots adjacent the upper and lower ends of the bracket 9 are of a size slightly greater than that required to receive the end turns of the upper and lower condenser sections 4 and 5. For the purpose of firmly anchoring these end turns in slots 11 and 12 when the bracket is fully assembled on the condenser, the upper and lower ends of the bracket are bent over to form a reverse bend 17 partially overlapping the slots 11 and 12. Each of the edge portions 18 of the bracket is thus in a position in which it will frictionally engage an end turn after a portion thereof has been inserted through the slot 11 or 12.

Figure 5:
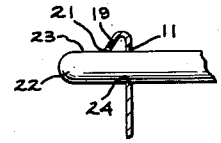
FIGURE 5 is an enlarged sectional view taken along line 5—5 of FIGURE 2.

In order to permit the end turn to be threaded a substantial distance through the slot 11 or 12 before actual engagement of an end portion 18 with the end turn, the edge portions 18 include a notch 19, extending in front of each of the slots 11 and 12. These notches 19 are of a length less than the length of the slots and are of a depth such that the U-shaped end turn can pass freely through the notch, that is between the base of the notch and the opposite side edge of the slot 11 or 12. After the end turn has been inserted part way into the slot and has spanned the notch 19, further insertion of the end turn causes the end turn to pass under the surfaces 21 of the edge portion 18 on each end of the notch 19 to provide a clamping or anchoring of the end turn. This action is more clearly shown in FIGURE 5 of the drawing from which it will be seen that the end turn 22 positioned in the notch 11 has its upper surface 23 engaged by the surface 21, which due to the resiliency of the return bend 17 forces the lower side of the end turn 22 downwardly into engagement with the lower wall 24 of the slot. Thus the end turn is securely anchored between the edge of the return bend 17 and the lower wall 24 of the slot 11.

Figure 6:
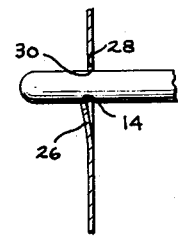
FIGURE 6 is an enlarged sectional view taken along line 6—6 of FIGURE 2.

To provide a similar wedging action for an end turn of the intermediate condenser section passing through an intermediate slot 14, the bracket includes slits 25 extending laterally from the opposite ends of the slot 14, which slits with the slot define a bendable tab 26, the free edge 27 of which forms one side edge of the slot 14. By providing a notch or notches 28 in either the free end of the tab 26 or in the opposite wall 29 of the slot 14 or both, the slot 14 is made sufficiently wide through most of its length so that a major portion of an end turn will easily pass most of the way through the slot. The notch or notches 28 are of a width less than the full width of the slot 14 so that upon further insertion of the end turn in the slot 14 the surfaces 30 of the walls adjacent the notch or notches will engage the end turn and firmly grip it as the end turn is fully inserted into the slot 14. Since the tab 26 is flexible it facilitates complete insertion of an end turn in the slot 14 and as illustrated in FIGURE 6 of the drawings this tab 26 is permanently bent slightly out of the plane of the bracket upon full insertion of an end turn into the slot 14.

From the above description it will be seen that there has been provided a supporting bracket so designed that it can be easily positioned part way onto the end turns of the various condenser sections by a manual operation. Once the bracket is mounted on the desired end turns, either by use of a machine or other mechanically applied pressure, the bracket is pressed completely onto the end turns against the resistances offered by the various portions of the bracket adapted to contact and bite into the end turns. Preferably two brackets are employed and as illustrated in FIGURE 1 of the drawing, these brackets are pressed onto the end turns until they come into engagement with the wires 7 or other means included in the condenser sections for facilitating heat transfer. Once the brackets are in this position, the anchoring or gripping forces firmly secure the bracket to the various sections.

While the invention has been described with reference to a particular embodiment thereof, it is to be understood that it is not limited thereto and it is intended by the appended claim to cover all such modifications as come within the scope of the invention.

What I claim as new and desire to secure by Letters Patent of the United States is:

A bracket for engaging and supporting the sections of a heat exchanger comprising spaced outer sections and at least one intermediate section, each of said sections including a plurality of parallel passes connected by U-shaped end turns, said bracket comprising a substantially flat sheet metal member having therein spaced outer slots adjacent opposed ends of said member receiving an end turn of each of said outer sections, and an intermediate slot receiving an end turn of said intermediate section, each of the ends of said member being return bent so that the edge portion thereof partially overlies the outer slot adjacent thereto and resiliently engages an end turn disposed in said slot, said overlying edge portion having a notch therein in registry with said slot and of a width less than that of the corresponding U-shaped end turn, said sheet member having slits therein extending laterally from the ends of said intermediate slot forming a resilient tab engaging the end turn disposed in said intermediate slot, a side wall of said intermediate slot having a notch therein of a width less than that of the corresponding U-shaped end turn, whereby, during the mounting of said bracket upon said end turns, said notches in said edge portions of said sheet member and said side wall of said intermediate slot will allow a portion of each of said end turns to be inserted through said slots before becoming engaged by an edge portion or side wall.

References Cited by the Examiner

UNITED STATES PATENTS

| | | | |
|---|---|---|---|
| 1,694,395 | 12/28 | Price | 113—118 |
| 2,119,761 | 6/38 | Wentworth | 165—183 XR |

CHARLES SUKALO, *Primary Examiner.*